United States Patent [19]

Martin et al.

[11] Patent Number: 5,073,854

[45] Date of Patent: Dec. 17, 1991

[54] DATA PROCESSING SYSTEM WITH SEARCH PROCESSOR WHICH INITIATES SEARCHING IN RESPONSE TO PREDETERMINED DISK READ AND WRITE COMMANDS

[75] Inventors: Michael W. Martin, Camberley; John C. Moor, Wokingham; Terence J. Bird, Simmondley, all of Great Britain

[73] Assignee: International Computers Limited, London, England

[21] Appl. No.: 352,370

[22] Filed: May 16, 1989

[30] Foreign Application Priority Data

Jul. 9, 1988 [GB] United Kingdom ............. 8816413

[51] Int. Cl.⁵ .................................... G06F 7/06
[52] U.S. Cl. .................................... 364/425; 364/254.3; 364/254; 364/228.5; 364/236.2; 364/DIG. 1
[58] Field of Search ... 364/200 MS File, 900 MS File

[56] References Cited

U.S. PATENT DOCUMENTS

| 3,742,460 | 6/1973 | England | 364/200 |
| 4,099,242 | 7/1978 | Honston | 364/200 |
| 4,583,166 | 4/1986 | Hartung | 364/200 |
| 4,630,234 | 12/1986 | Holly | 364/900 |
| 4,760,523 | 7/1988 | Yu | 364/200 |
| 4,783,705 | 11/1988 | Moon | 364/200 |
| 4,876,643 | 10/1989 | McNeill | 364/200 |

Primary Examiner—Thomas C. Lee
Assistant Examiner—Eric Coleman
Attorney, Agent, or Firm—Lee, Mann, Smith, McWilliams & Sweeney

[57] ABSTRACT

A data processing system is described including a host computer connected to peripherals by a Small Computer System Interface (SCSI) bus. A search processor is also attached to the SCSI bus and receives commands from the host as if it were a standard disc controller unit. The search processor responds to a write command to set up a search criterion, and then responds to a read command to perform a search, so as to retrieve data items satisfying the search criterion. If the logical unit number (LUN) in the command does not match the LUN assigned to the search processor, the command is passed transparently to the data store, allowing the host to access the data store directly.

9 Claims, 4 Drawing Sheets

| BYTE | BIT | | | | | | | |
|---|---|---|---|---|---|---|---|---|
| | 7 | 6 | 5 | 4 | 3 | 2 | 1 | 0 |
| 00 | | | | OP CODE | | | | |
| 01 | LOGICAL UNIT NO. | | | LOGICAL BLOCK ADDRESS | | | | |
| 02 | LOGICAL BLOCK ADDRESS | | | | | | | |
| 03 | LOGICAL BLOCK ADDRESS | | | | | | | |
| 04 | NUMBER OF BLOCKS | | | | | | | |
| 05 | | | | | | | | |

*Fig. 3A.*

| BYTE | BIT | | | | | | | |
|---|---|---|---|---|---|---|---|---|
| | 7 | 6 | 5 | 4 | 3 | 2 | 1 | 0 |
| 00 | | | | OP CODE | | | | |
| 01 | 1 | 1 | 1 | | | | | |
| 02 | | | | | | | | |
| 03 | SEARCH COMMAND | | | | | | | |
| 04 | NUMBER OF BLOCKS | | | | | | | |
| 05 | | | | | | | | |

*Fig. 3B.*

DATA PROCESSING SYSTEM WITH SEARCH PROCESSOR WHICH INITIATES SEARCHING IN RESPONSE TO PREDETERMINED DISK READ AND WRITE COMMANDS

BACKGROUND TO THE INVENTION

This invention relates to data processing systems.

British Patent Specification No. 1 497 676 describes a search processor designed to perform search operations on a stream of data, so as to retrieve data items that satisfy a predetermined criterion. For example, the search processor may retrieve data items which contain a field equal to a specified key value.

Such a search processor may be connected to a conventional general purpose host computer. When the host requires a search to be performed, it sends a command to the search processor, specifying the criterion for the search, and the area to be scanned, and instructing the search processor to begin the search. The search processor then carries out the search, and returns retrieved data to the host computer as required.

The use of a specialized search processor enables search operations to be performed very rapidly, and provides a significant improvement in performance compared with conventional software search techniques.

One such specialized processor that is commercially available is the CAFS search processor, manufactured by International Computers Ltd.

A problem with the use of such a search processor is how it is to be integrated with the host computer. This conventionally requires customization of the host-peripheral interface, in terms of hardware, protocols, and operating system software. One object of the present invention is to overcome or alleviate this problem.

SUMMARY OF THE INVENTION

According to the invention there is provided a data processing system comprising a host computer having a bus for attachment of peripheral units, the host computer being arranged in operation to issue block read/write commands in a predetermined format on the bus for execution by the peripheral units, the system also including a search processor for performing search operations on data items held in a data store, the search processor being connected to said bus and being responsive to a predetermined one of said block write commands to set up a search criterion specified by the block write command, the search processor also being responsive to a predetermined one of said block read commands to perform a search operation to retrieve from the data store data items satisfying said search criterion and to return those data items over the bus to the host computer.

It can be seen that the search processor is connected to the host by means of a bus in the same way as the peripheral units, and can therefore be controlled by the same block read/write commands as are used for controlling data store peripherals.

Preferably, the bus is a standard bus, such as the known Small Computer System Interface (SCSI) bus. The use of such a bus allows standard, readily available interface hardware and software to be used for controlling the search processor.

BRIEF DESCRIPTION OF THE DRAWINGS

One data processing system in accordance with the invention will now be described by way of example with reference to the accompanying drawings.

FIG. 3(a) and (b) shows the formats of commands on the SCSI bus.

DESCRIPTION OF AN EMBODIMENT OF THE INVENTION

Figure 1:
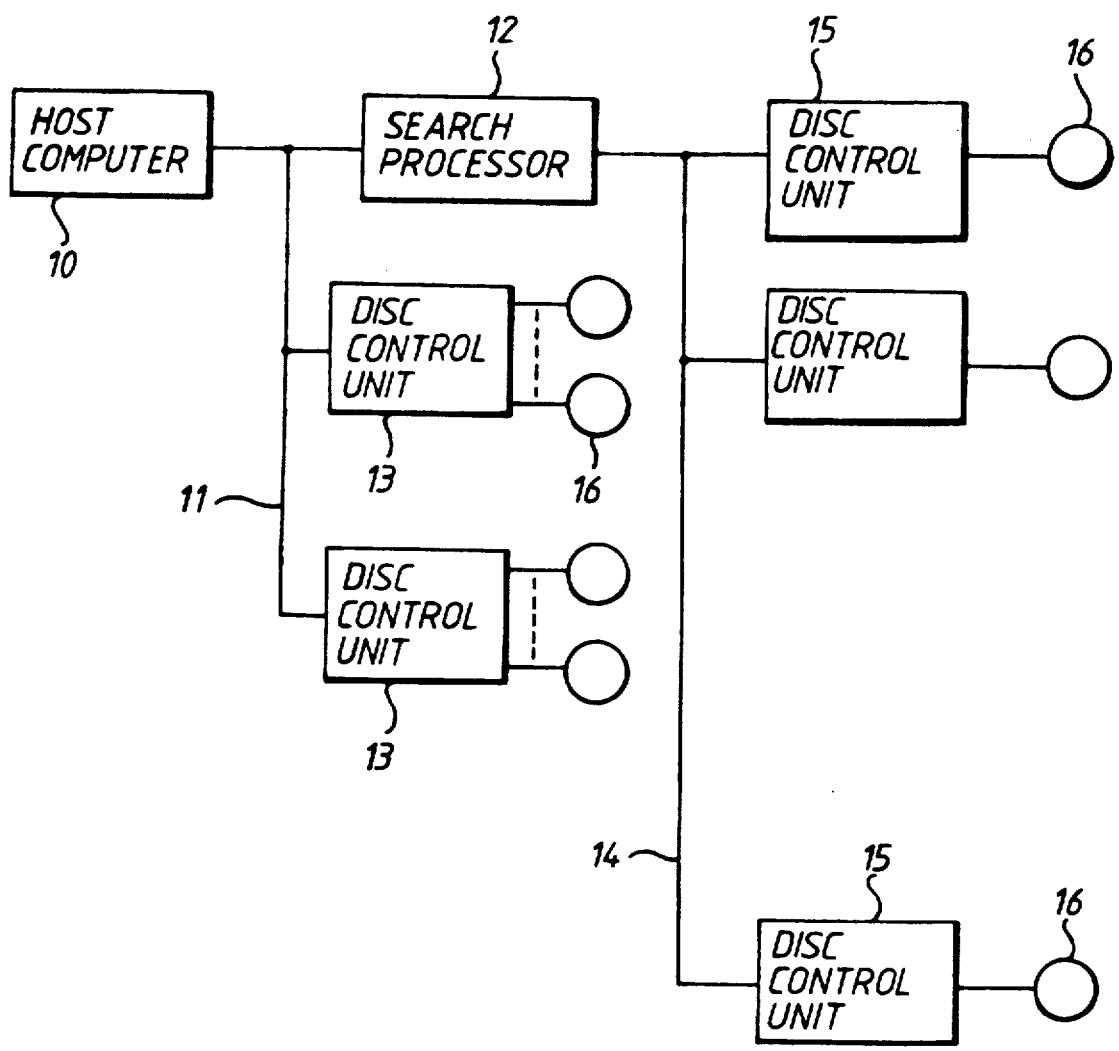
FIG. 1 shows an overall view of the data processing system, including a host computer connected to a search processor by way of a SCSI bus.

Referring to FIG. 1, this shows a data processing system comprising a host computer 10, which may be an ICL DRS 300 computer, manufactured by International Computers Ltd.

The host computer 10 is connected by means of a first bus 11 to a search processor 12 and to a number of disc controller units 13. The search processor 12 is in turn connected by means of a second bus 14 to a plurality of disc controller units 15. Each of the disc controller units 13,15 has one or more disc drive units 16 connected to it. The disc controllers and disc drive units may be standard, commercially available units and so need not be described further herein.

In this example, both the first and second busses 11,14 are standard SCSI busses. The first bus 11 is hereinafter referred to as the Host SCSI bus, while the second bus 14 is referred to as the Disc SCSI bus.

The structure of the SCSI bus, and its associated protocols are defined by the American National Standards Institute (ANSI X3T9.2).

Each unit connected to a SCSI bus is allocated an address, referred to as its SCSI address, which uniquely identifies that unit on the bus. In the present example, the units connected to the host SCSI bus are allocated the following addresses:

| Unit | SCSI address |
|---|---|
| Host | 7 |
| Search Processor | 2 |
| Disc control units | 0,1 |

The units connected to the disc SCSI bus are allocated the following addresses:

| Unit | SCSI address |
|---|---|
| Search Processor | 7 |
| Disc control units | 0,1—6 |

It should be noted that the search processor has a different SCSI address according to which bus it is viewed from.

Wherever the host wishes to send a command to one of the other units on the host SCSI bus, it first places the address of that unit on the bus, which causes that unit to be selected. It then places the command on the bus.

Each command contains a 3-bit logical unit number (LUN) which identifies one of up to eight sub-units associated with the selected unit. In the case of the disc controllers 13, the LUN identifies one of the disc drives 16 connected to the selected controller.

In the case of the search processor 12, the LUN is interpreted as follows.

If LUN=7, then the command is intended for the search processor itself, and is used to instruct the search processor to set up or execute some search task, as will be described later.

If LUN is not equal to 7, the command is intended for one of the disc units connected to the disc SCSI. The search processor uses a look-up table to convert the LUN into a corresponding SCSI address, and places this address on the disc SCSI so as to select one of the disc controllers 15. The search processor then passes the command, and any subsequent data, transparently between the host and disc SCSI busses.

Thus, it can be seen that, viewed from the host, the search processor has SCSI address=2, LUN=7, while the discs 16 attached to the disc SCSI bus 14 have SCSI address=2, LUN=0-6.

Figure 2:
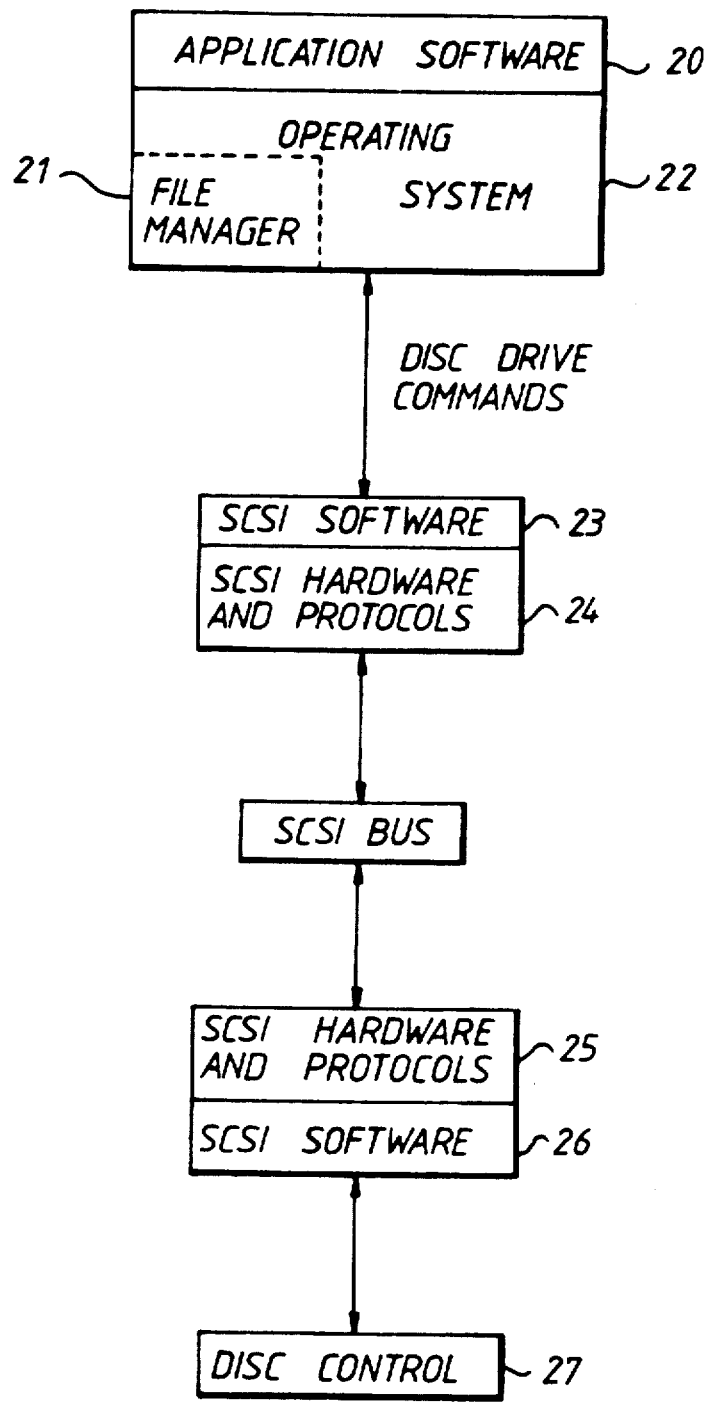
FIG. 2 shows the software required for the SCSI bus.

Referring now to FIG. 2, this shows the standard software required to connect the host computer 10 to a disc control unit 13 by way of the SCSI bus 11.

The host computer runs applications software 20, file management software 21, and operating system software 22. The operating system communicates by way of disc drive commands with SCSI software 23, and with SCSI hardware and protocols 24, which reside in a special SCSI chip, such as the NCR 5385 SCSI Protocol Converter. The SCSI hardware and protocols interface with the SCSI bus.

The disc control unit has similar SCSI hardware and protocols 25, and SCSI software 26. The SCSI software communicates with the disc control hardware or firmware 27, which in turn communicates with one or more disc drive units.

All the above software is conventional and so need not be described further in the present specification.

The disc control units 15 contain similar SCSI software and protocols for interfacing to the disc SCSI bus 14, while the search processor 12 contains SCSI software and protocols for interfacing with both the host SCSI bus 11 and the disc SCSI bus 14.

Referring now to FIG. 3, this shows the format of the commands on the SCSI busses.

Each command consists of five consecutive bytes (bytes 00-05), each byte consisting of eight bits (bits 7-0).

FIG. 3A shows the format of a command from the host computer to one of the disc controllers.

Bits 4-0 of byte 00 consist of an operation code, indicating the operation to be performed by the recipient of the command. For example, the operation code 01000 is a READ code, indicating that the host wishes to read data from a disc file. Similarly, the code 01010 is a WRITE code, indicating that the host wishes to write data to a disc file.

Bits 7-5 of byte 01 represent the logical unit number LUN, identifying which of the disc drives connected to the disc controller is to be selected.

The remaining bits of byte 01, along with bytes 02 and 03, represent a logical block address (LBA) specifying which block of data in the selected disc file is to be accessed.

Byte 04 specifies the number of blocks of data to be transferred from the host to the disc file in the case of a write operation, or from the disc file to the host in the case of a read operation.

Byte 05 is reserved for purposes not relevant to the present invention.

In the case of a WRITE command, the host follows the command with one or more 512-byte blocks of data to be written into the specified location of the selected disc drive. In the case of a READ command, the selected disc drive responds by returning one or more 512-byte blocks of data to the host.

As mentioned above, a command addressed to the search processor and having LUN=7 is interpreted as a command for the search processor. FIG. 3B shows the format of such a command.

As before, byte 00 contains the operation code and byte 01 contains the LUN, in this case equal to 7. However, in this case, the block address LBA is interpreted as a search command code which, in conjunction with the operation code, specifies the action to be performed by the search processor, as follows.

In the case of a WRITE command (operation code=01010) the search command code in byte 03 has the following significance:

31 Set Partial Results
05 Set Task Specification
03 Write Scan Data
71 Load
01 Initialize
07 Set Scan Area The Set Partial Results command is followed by a 512-byte block of data, containing data to be written into a partial results store within the search processor, so as to initialize it for a search.

The set Task Specification Command is followed by one or more blocks of data, specifying a search criterion for the search processor.

The Write Scan Data command causes the search processor to perform a search scan on data sent from the host computer over the host SCSI, and to retrieve data items which match a search criterion specified by a previous Set Task Specification command. This command can be used for testing the search processor.

The Load command causes a control program to be loaded into the search processor from the host SCSI.

The Initialize command initializes the state of the search processor.

The Set Scan Area command passes data to the search processor specifying which areas of the discs are to be scanned by the search processor.

In the case of a READ command (operation code=01000) the Search command code in byte 03 has the following significance:

02 Retrieve Data
06 Continue Retrieve
34 Read Partial Results
74 Dump
54 Dump Continue
04 Sense Status The Retrieve Data command causes the search processor to perform a scan through the disc data areas specified by a previous Set Scan Area command, and to retrieve data items which match the search criterion specified by a previous Set Task Specification command.

There are two distinct terminations associated with this command (a) termination of the scan, and
(b) completion of the retrieve data command.

It is possible for the Retrieve Data command to complete but the scan to continue.

Termination of the scan takes place if any one of the following conditions is met (a) All the data specified in the Set Scan Area command has been scanned.

(b) An internal retrieval buffer in the search processor has overflowed.

(c) An error has been detected.

Termination of the Retrieve Data command takes place if any one of the following conditions is met:

(a) The scan has terminated (as specified above).

(b) Some retrieved results are pending and the scan has reached a point, as defined in the Set Scan Area command, where "early" results should be returned to the host.

(c) Retrieved results have filled the number of 512-byte blocks specified in byte 04 of the Retrieve Data command.

Where the Retrieve Data command is terminated in cases (b) and (c) above, the scan is not terminated, but continues. Any further retrieved results are placed in the internal retrieval buffer for subsequent retrieval by one or more Continue Retrieve commands (see below). In all three cases, on completion of the Retrieve Data command, the number of bytes transferred from the search processor to the host computer is padded out with zeros to the number of 512-byte blocks specified in byte 04 of the Retrieve Data command.

The Continue Retrieve command behaves in a similar manner to the Retrieve Data command. It is used to retrieve further blocks of data after a previous Retrieve Data or Continue Retrieve command has terminated in cases (b) and (c) above.

The Read Partial Results command is used to read partial results (i.e. search state) held in the search processor.

The Dump command is used to transfer dump data from the search processor to the host computer, for diagnostic purposes.

The Dump Continue command is used to transfer further dump data from the point where the last Dump or Dump Continue command terminated.

The Sense Status command is used to transfer a block of data containing status information from the search processor to the host.

It should be noted that all the READ and WRITE commands cause data to be transferred in multiples of 512 bytes. Thus, as far as the host software is concerned, access to the search processor looks exactly the same as a disc read/write operation.

Figure 4:
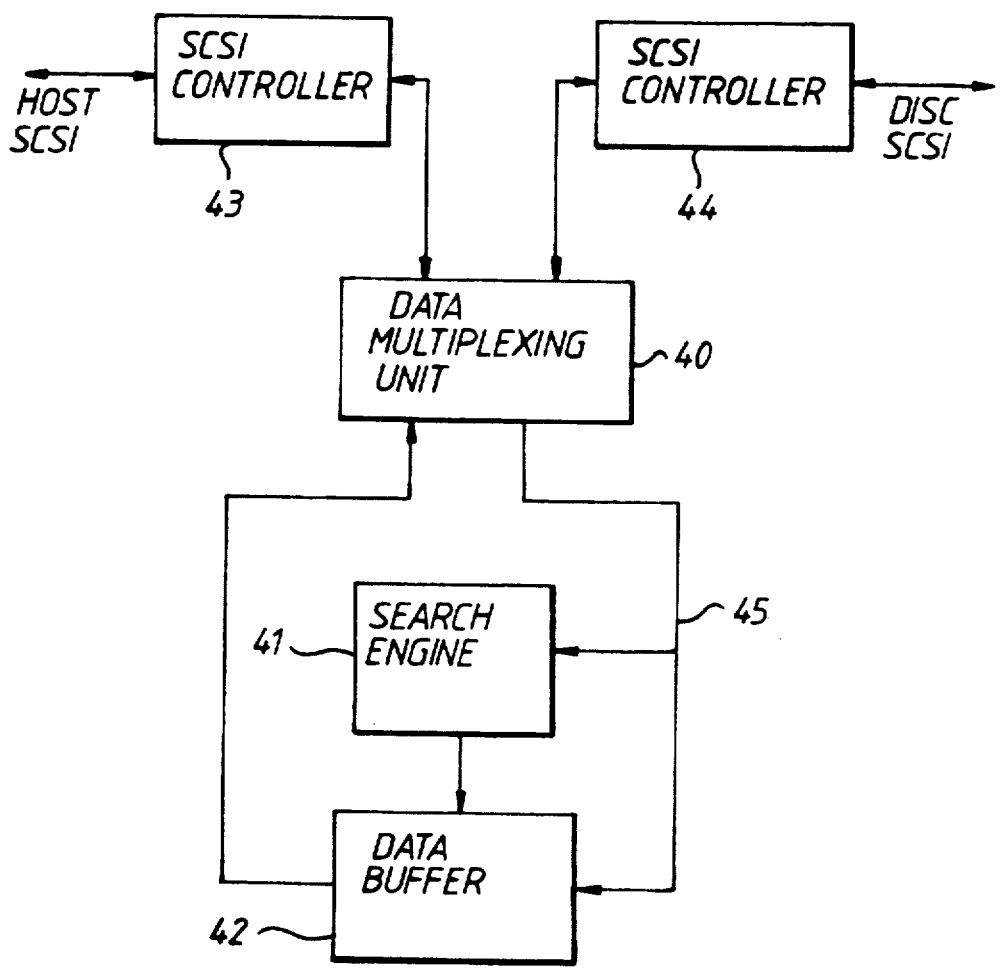
FIG. 4 shows the search processor in more detail.

Referring now to FIG. 4, this shows the search processor 12 in more detail.

The search processor comprises a data multiplexing unit (DMU) 40, a search engine 41, and a data buffer 42.

The DMU 40 is connected to the host SCSI bus and to the disc SCSI bus by way of respective SCSI controllers 43,44, each of which consists of a standard NCR 5385 SCSI controller device. The DMU also has an output connected to a scan highway 45, which in turn is connected to the search engine 41.

The search engine 41 compares the data on the scan highway with a set of search keys, and retrieves those data items which satisfy a specified search criterion. The retrieved data items are placed in the data buffer 42.

The DMU can route data along the following paths:

(a) From the Host SCSI to the scan highway 45.

(b) From the Disc SCSI to the scan highway 45.

(c) From the data buffer 42 to the Host SCSI.

(d) From the data buffer 42 to the Disc SCSI.

Paths (a) and (d) or paths (b) and (c) can be in operation simultaneously.

The arrangement also allows part of the data buffer to be used during transparent disc read/write operations for buffering data between the host SCSI and the disc SCSI.

The search engine 41 may be identical to that of the commercially available CAFS search processor mentioned above, and so it is not necessary to describe this unit in further detail.

We claim:

1. A data processing system comprising:

(a) a data bus, (b) host computer means connected to the bus, for issuing disk read and disk write commands in a predetermined format on the bus, (c) a plurality of disk file units connected to the bus, for responding to each of said disk read commands: each of said disk write commands by sending and receiving blocks of data over the bus, to and from said host computer means and (d) search processor means connected to said bus, for responding to a predetermined one of said disk write commands by setting up a search criterion specified by that command, and for responding to a predetermined one of said disk read commands by performing a search operation to retrieve data items satisfying said search criterion and returning those data items over said bus to the host computer means.

2. A system according to claim 1 further including data storage means connected to the search processor for holding data items for searching by the search processor.

3. A system according to claim 2 wherein the search processor means comprises means for transparently passing predetermined commands from the data bus to the data storage means, thereby allowing the host computer means to access the data storage means directly.

4. A system according to claim 2 wherein the data storage means comprises a plurality of disk file units connected to the search processor means by way of a further data bus.

5. A system according to claim 1 wherein said data bus is a Small Computer System Interface (SCSI) bus.

6. A data processing method comprising the following steps:

(a) sending disk read and disk write commands in a predetermined format a host computer over a data bus to a plurality of disk file units and to a search processor, (b) causing at least one of said plurality of disk file units to respond to each of said disk read commands by returning a block of data over the bus to the host computer, and to respond to each of said disk write command by accepting a block of data over the bus from the host computer, (c) causing the search processor to respond to a predetermined one of said disk write commands by setting up a search criterion specified by that command, and (d) causing the search processor to respond to a predetermined one of said disk read commands by performing a search operation to retrieve data items satisfying said search criterion and then returning at least one block of data containing those data items over the bus to the host computer.

7. A method according to claim 6 wherein said data bus is a Small Computer System Interface (SCSI) bus.

8. A method according to claim 6 including further steps as follows:
 (a) causing the search processor, after returning a predetermined number of blocks of data to the host computer, to continue searching to retrieve further data items satisfying said search criterion, and
 (b) causing the search processor to respond to a further one of said read commands, to return at least one block of data containing said further data items over the bus to said host computer.

9. A method according to claim 6 including the further step of causing the search processor to transparently pass predetermined commands from the data bus to a data store, thereby allowing the host computer to access the data store directly.

* * * * *